United States Patent [19]

Fuziwara et al.

[11] Patent Number: 4,639,083
[45] Date of Patent: Jan. 27, 1987

[54] LENS MOUNTING

[75] Inventors: Yutaka Fuziwara; Hiroshi Yamamoto, both of Kanagawa, Japan

[73] Assignee: Canon Kabushiki Kaisha, Tokyo, Japan

[21] Appl. No.: 638,745

[22] Filed: Aug. 8, 1984

[30] Foreign Application Priority Data

Aug. 18, 1983 [JP] Japan .................................. 58-150827

[51] Int. Cl.4 ................................................ G02B 7/02
[52] U.S. Cl. ...................................... 350/255; 350/429
[58] Field of Search ................................. 350/255, 429

[56] References Cited

U.S. PATENT DOCUMENTS 3,841,735 10/1974 Katagiri et al. ...................... 350/255
4,210,387 7/1980 Ogawa ................................. 350/429
4,514,039 4/1985 Kawai .................................. 350/255

Primary Examiner—John K. Corbin
Assistant Examiner—Loha Ben
Attorney, Agent, or Firm—Toren, McGeady and Goldberg

[57] ABSTRACT

A lens mounting including a distance adjusting ring responsive to a signal representing the object to an in-focus position, and provided with an intermediate stopper retractable from an intermediate point in the range of rotation of the aforesaid distance adjusting ring.

3 Claims, 14 Drawing Figures

1

LENS MOUNTING

BACKGROUND OF THE INVENTION

1. Field of the Invention

This invention relates to lens mountings for use in auto-focus cameras, and more particularly to a device for controlling the range of rotation of a distance adjusting ring.

2. Description of the Prior Art

The ordinary auto-focus cameras generally operate in such a manner that the distance to an object to be photographed is measured by the range finder, and then, based on the output signal therefrom, a distance adjusting ring of the lens mounting is rotated to move the focusing lens member to an in-focus position. For some combinations of the value of the object distance and the occasional position of the focusing lens member, however, a problem arises that it takes a considerably long time to reach the in-focus condition.

FIG. 1 illustrates an example of the conventional zoom lens mounting used in the auto-focus camera, and its cross-section along A—A line of FIG. 1 is shown in FIG. 2. Here, a guide tube 1 has axially elongated slots 1a and 1b, and a mount portion 1c for coupling with a camera body (not shown), and is fixedly secured to an outer barrel 4 by a screw fastener 3. A cam sleeve 2 is rotatably fitted on the outer diameter of the guide tube 1. An electric motor 5 is mounted on the outer barrel 4. Movably fitted in the inner diameter of the guide tube 1 is a sleeve 6 having a helicoid screw cut in the inner surface thereof and meshing with a helicoid screw 7a of a lens cell 7 holding a lens component I. A cam follower pin 8a extends radially outwardly of the lens cell 7 through the first slot 1a of the guide tube 1 into a camming groove 2a of the cam sleeve 2. Another lens cell 9 holding a second lens component II is also movably fitted in the inner diameter of the guide tube 1, and has a cam follower pin 8b radially outwardly extending through the second slot 1b into a second camming groove 2b of the cam sleeve 2. A retainer ring 10 having a ball race surface is fixedly secured to the guide tube 1 by a screw fastener 10a and retains a ring 11 having a ball race surface. A distance adjusting ring 12 between the combined ring of the retainer ring 10 and the ring 11 and the outer barrel 4 has a ball race surface 12a facing through balls at the race surfaces of the rings 10 and 11. An outward pointing radial projection 12b of the distance adjusting ring 12 lies in a circumferential inner recess portion 4a of the outer barrel 4. The outer periphery of the distance adjusting ring 12 is provided with a racked portion 12c drivenly connected through a pinion 14 to the output shaft of the motor 4. A radial projection 7b of the first lens cell 7 extends into an axially elongated groove 12d formed in the inner surface of the distance adjusting ring 12. The outer barrel 4 is drivingly connected through a pin 15 to the cam sleeve 2.

Then, when the outer barrel is manually turned about the optical axis, the lens components I and II are axially moved in differential relation to effect variation of the image magnification. To effect automatic focusing, a range finder 17 evaluates the object distance. Responsive to the output of the range finder 17, a control circuit 18 supplies electrical power from a battery 19 to rotate the motor 5 along with the distance adjusting ring 12 through the pinion 14. Rotation of the distance adjusting ring 12 is transmitted through the helicoid screw connection 7a to axial movement of the first lens component I.

With the range finder 17 of the generally employed or TTL type, however, as is well known, there are some combinations of the position of the object and the position of the lens component I for which it is impossible to detect the in-focus condition. Even with other types such as that employing the supersonic generator, it is impossible to precisely measure the object distance over the entire range from infinity to the minimum.

To improve this drawback of the TTL type, there has been a previous proposal that when no signal is detected, the motor is reversed and continues to be energized until the signal is obtained. According to this proposal, if the motor 5 rotates in an opposite direction to that in which the lens component I is moved to bring the image into focus, the projected portion 12b of the distance adjusting ring 12 will abut against either one of the radial shoulders 4c and 4d at the respective ends of the recessed portion 4a of the outer barrel 4 so that rotation of the distance adjusting ring 12 is limited. It is also known to use two switches at the shoulders 4c and 4d of which the outputs control the direction of rotation of the motor 5, as, for example, disclosed in Japanese Laid-Open Patent Application No. SHO 56-94334.

In consideration of achieving good manageability of the photographic lens, the angle of rotation of the distance adjusting ring is generally taken at a considerably large value as indicated at $\theta$ in FIG. 2. If the focusing lens member is moved in the opposite direction to that in which the in-focus signal is detected in a least time, as has been mentioned above, it will take a very long time to arrive at the in-focus position. Even with the other types than the TTL one, when the angle of rotation of the distance adjusting ring 12 is large, a considerably long time is necessary to reach the in-focus condition.

SUMMARY OF THE INVENTION

An object of the present invention is to eliminate the above-described problem and to provide for the lens mounting with an intermediate stopper capable of altering the range of movement of the focusing lens member so that as the range of movement of the focusing lens member is decreased, the time necessary to reach the in-focus condition is shortened, thereby it being made possible to achieve speed up of automatic focusing. What is essential to the present invention is that the lens mounting for the camera in which the object distance is detected and by its detection signal the distance adjusting ring is rotated to move the focusing lens member to the in-focus position is characterized by the provision of a retractable intermediate stopper at an intermediate point in the entire range of rotation of the aforesaid distance adjusting ring.

BRIEF DESCRIPTION OF THE DRAWINGS

FIGS. 4 and 5 are cross-sectional views taken along B—B line of FIG. 3.

DETAILED DESCRIPTION OF THE PREFERRED EMBODIMENTS

Figure 1:
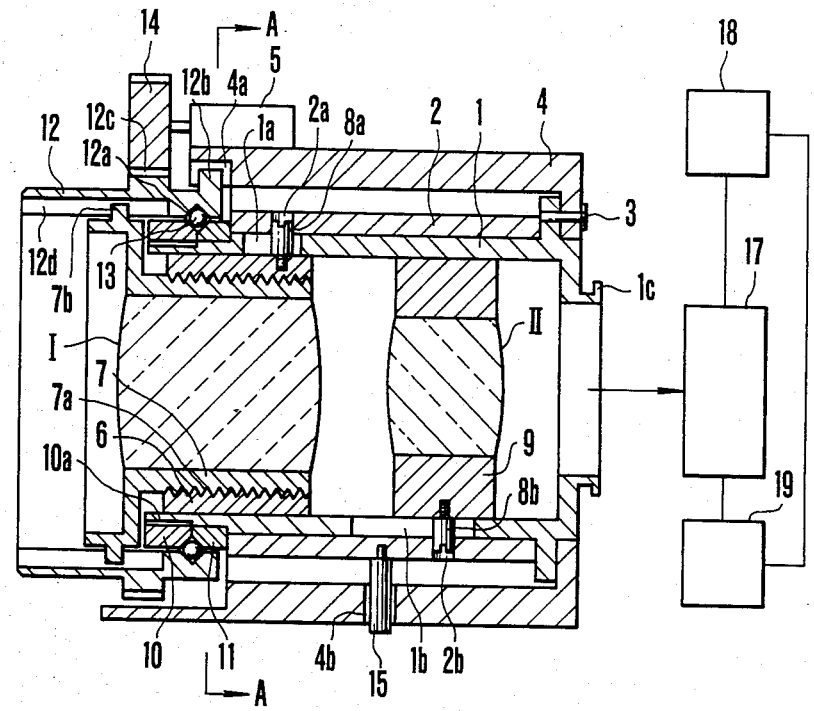
FIG. 1 is a sectional view of a typical example of the conventional lens mounting.
Figure 2:
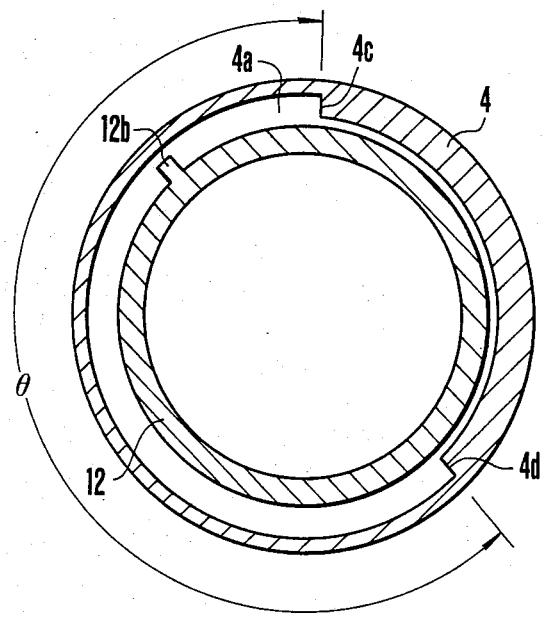
FIG. 2 is a cross-sectional view taken along A—A line of FIG. 1.

The present invention will next be described in great detail in connection with embodiments thereof by reference to FIG. 3 and those that follow. The same reference characters have been employed to denote similar parts to those shown in FIGS. 1 and 2 in construction and arrangement unless otherwise particularly stated.

Figure 3:
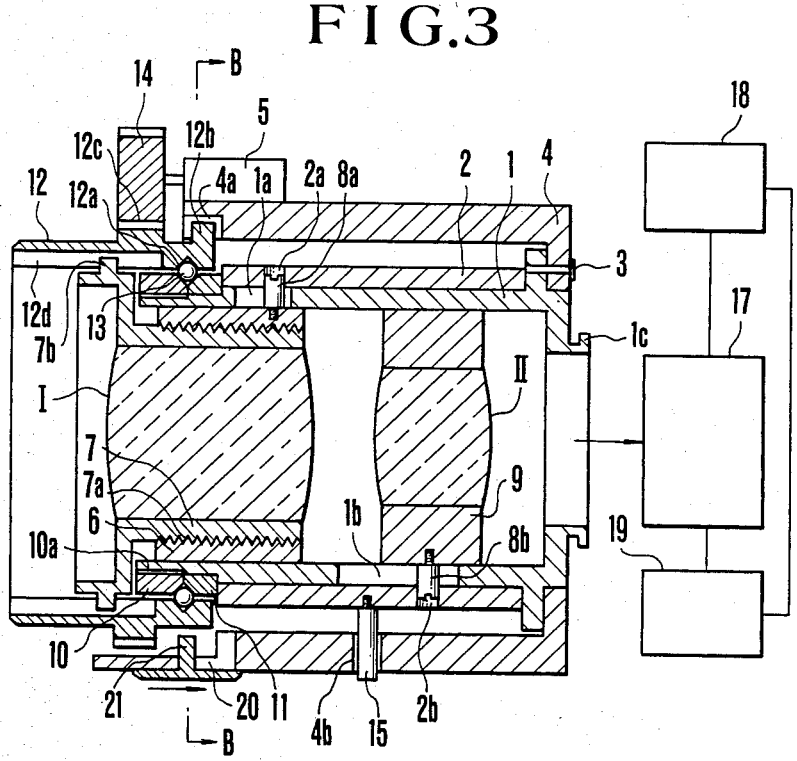
FIGS. 3 to 4 illustrate embodiments of the lens mounting according to the present invntion, with FIG. 3 being a sectional view of the first embodiemnt.
Figure 4:
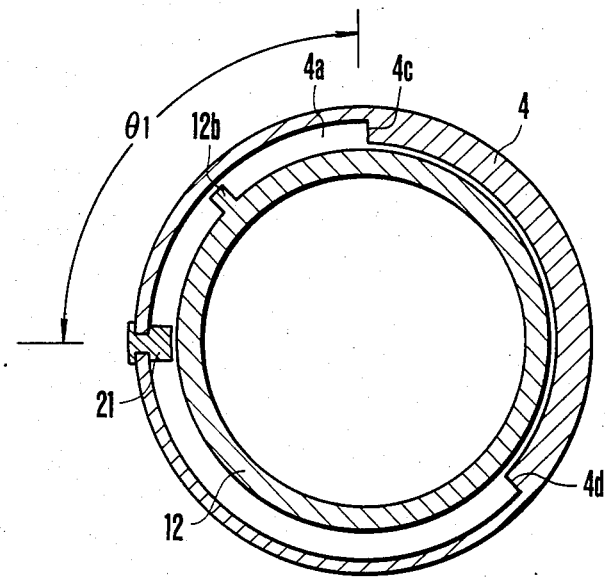

Now, FIGS. 3 and 4 illustrate the first embodiment of the present invention where the outer barrel 4 is provided with an axially elongated slot 20 in which is movably fitted an intermediate stopper 21 so that the stopper 21 is movable in an axial direction indicated by arrow in FIG. 3.

In general, a majority of the photographic situations which may be encountered by the auto-focus cameras are infinitely distant objects such as a landscape to portraitures at distances of not less than 1 meter, while closeup exposures are relatively few. Therefore, if a limitation is applied that only objects ranging from infinity to portraiture distances have to be photographed, the angle of rotation of the distance adjusting ring 12 can be reduced to a considerably small value as indicated by θ1 in FIG. 4. When the range within which the projection 12b of the distance adjusting ring is movable is limited to θ1 by the intermediate stopper 21, the time until the image is in focus can be shortened to a large extent.

FIGS. 3 and 4 illustrate an operative position of the intermediate stopper 21. When the projection 12b is in contact with the shoulder 4c, the photographic lens is focused to an infinitely distant object, and when the projection 12b is in contact with the intermediate stopper 21, focusing is effected to an object distance of about 1 meter. When to further approach an object similarly to the general photographic lens, the intermediate stopper 21 has to be moved in the direction of arrow of FIG. 3 to be retracted from the path of movement of the projection 12b, whereby the range of rotation of the distance adjusting ring 12 is altered to the conventional one indicated by θ in FIG. 2. Thus, as in the ordinary cameras, shots with focusing from infinity to closeup become possible to make.

Figure 5:
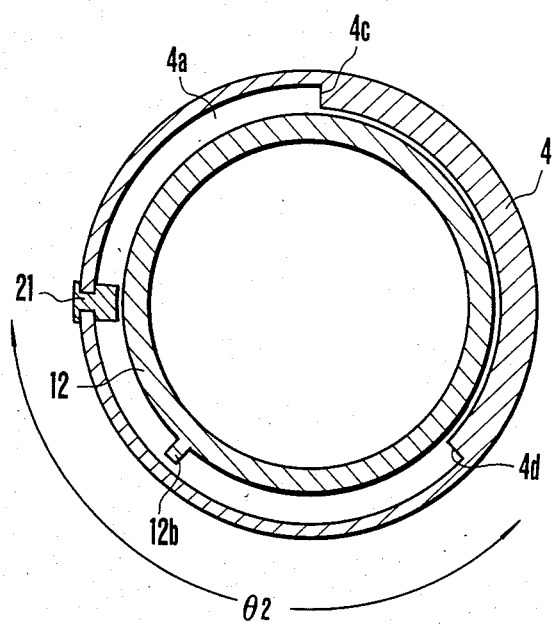

An exceptional way of utilizing the stopper 21 is that when of the projection 12b of the distance adjusting ring lies in another region θ2 as shown in FIG. 5, the intermediate stopper 21 is inserted into the operative position, whereby focusing is effected only to shorter object distances than 1 meter, with an advantage that the time necessary to reach the in-focus condition is shortened also in closeup photography.

Figure 6:
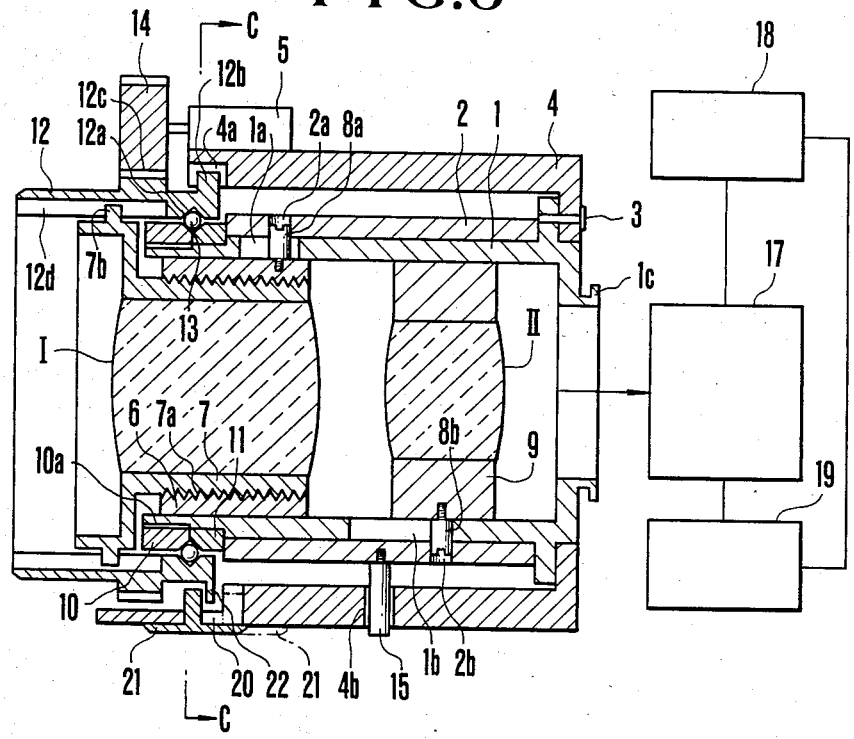
FIG. 6 is a sectional view of the second embodiment.
Figure 7:
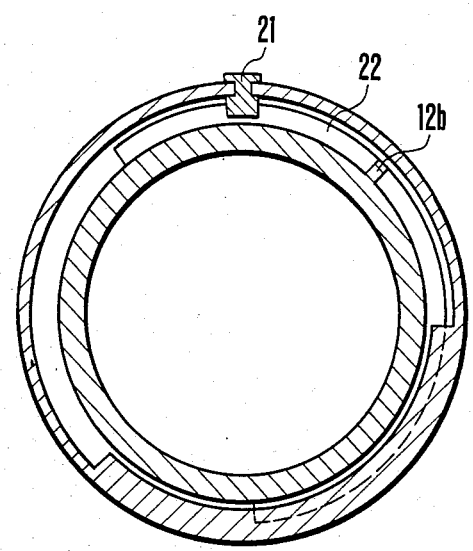
FIG. 7 is a cross-sectional view taken along C—C line of FIG. 6.
Figure 8:
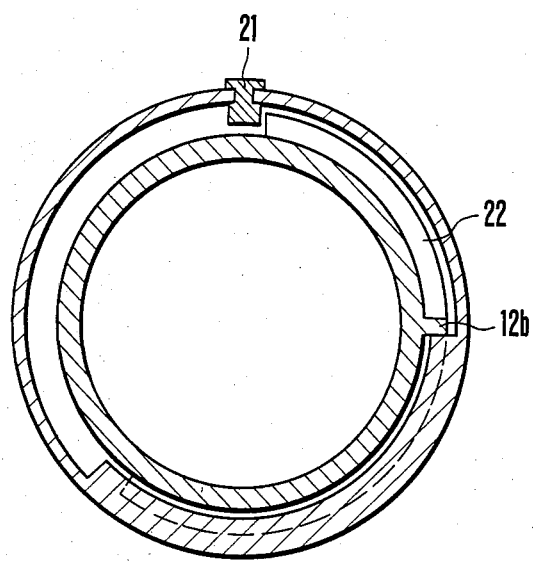
FIG. 8 is a cross-sectional view taken along C—C line of FIG. 6 when the distance adjusting ring is set to an object at infinity.

FIGS. 6 to 8 illustrate the second embodiment obtained by partly modifying the first embodiment. In this case, provided on the circumference of the distance adjusting ring 12 is a partly cutout flange 22 so that it is in a certain region of the focusing range that the intermediate stopper 21 is hindered from retracting as it abuts against the flange 22. In FIG. 6 the operative position of the intermediate stopper 21 is illustrated by the solid lines, while the retracted position of the intermediate stopper 21 past the cutout portion of the flange 22 is illustrated by dashed lines.

FIG. 7 in a cross-sectional view taken along C—C line of FIG. 6 illustrates the distance adjusting ring 12 lying in the first region of the focusing range. At any point in the range except those for the infinite and minimum object distances, the intermediate stopper 21 is prevented from axially moving. FIG. 8 illustrates the terminal focusing position of the distance adjusting ring 12 for an infinitely distant object where the intermediate stopper 21 is allowed to axially move.

The above-described second embodiment has an additional advantage that where the distance adjusting ring operates in the first region for normal shots with an infinitely distant object to portraiture, or in the second region for closeup photography can be easily distinguished by the photographer looking at the position of the intermediate stopper 21.

Figure 9:
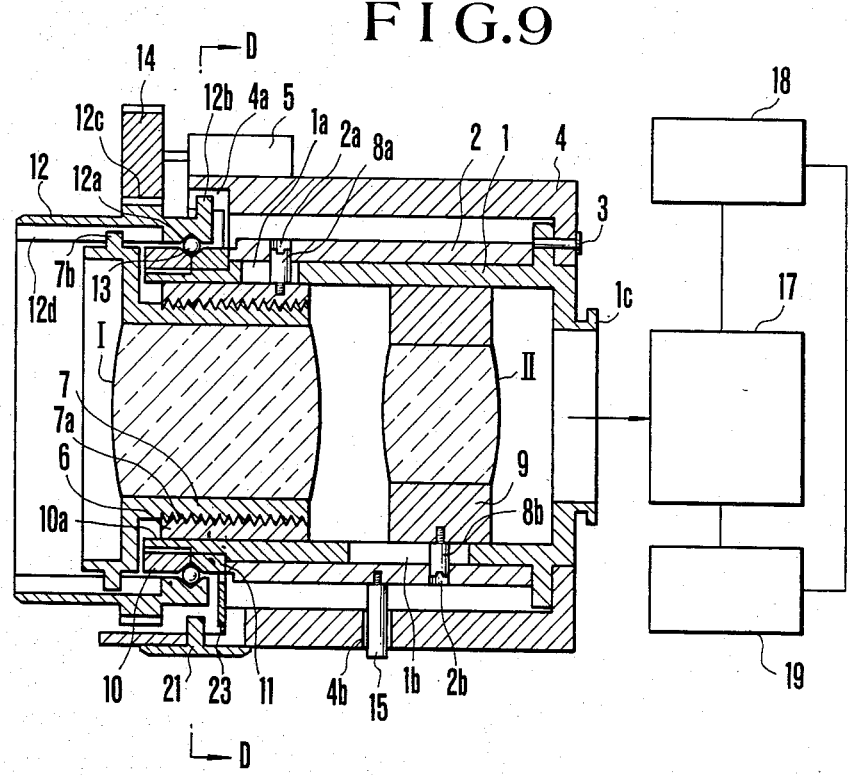
FIG. 9 is a sectional view of the third embodiment.
Figure 10:
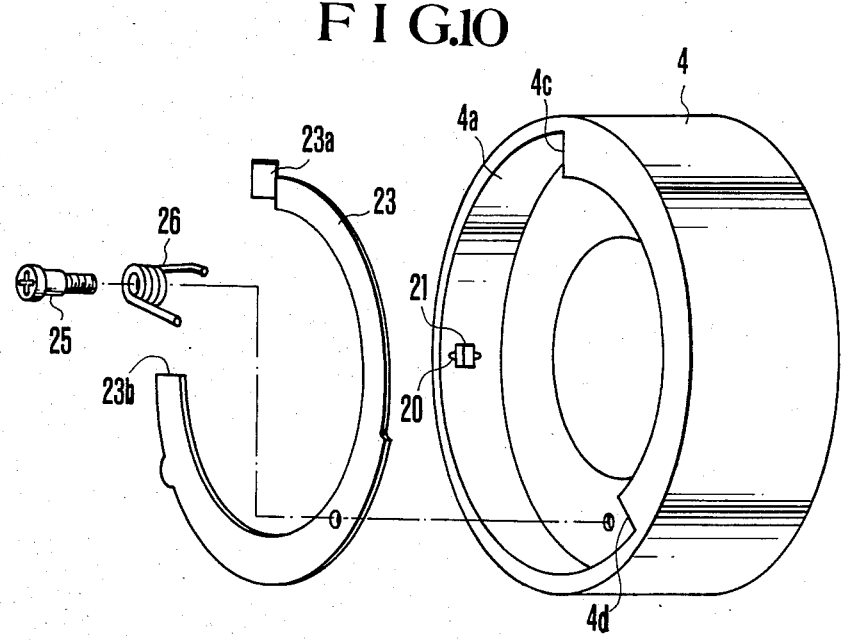
FIG. 10 is an exploded perspective view of the main parts of FIG. 9.
Figure 11:
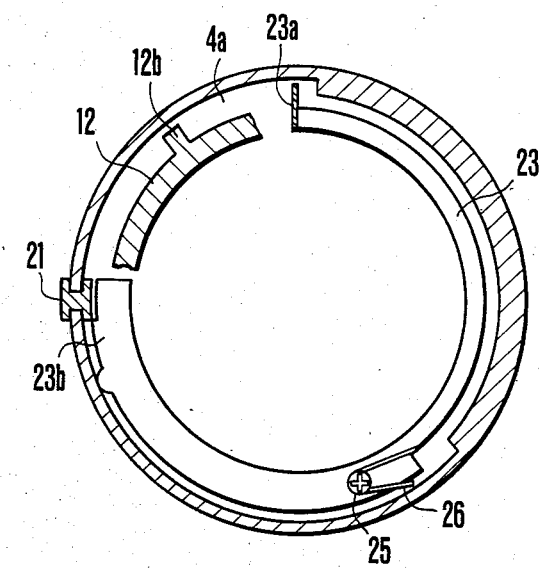
FIG. 11 is a cross-sectional view taken along D—D line of FIG. 9.
Figure 12:
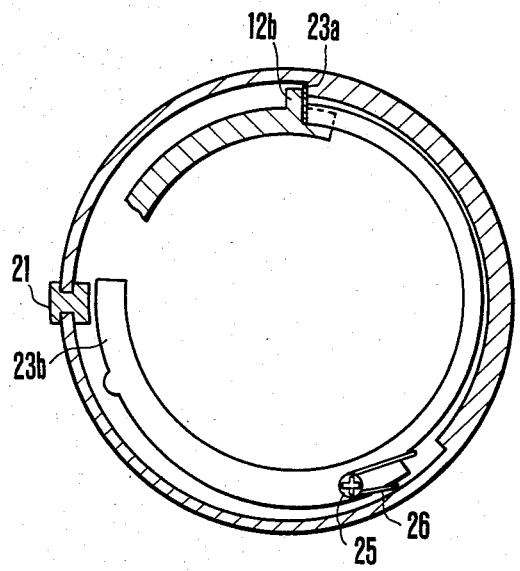
FIG. 12 is similar to FIG. 11 except that the distance adjusting ring is set to an object at infinity.

FIGS. 9 to 12 illustrate the third embodiment of the present invention where the intermediate stopper 21 is otherwise prevented from being set in the operative position. For this purpose, a "C" shaped member 23 is pivotally mounted at the center thereof to a pin 25 on a front wall of the outer barrel 4. A spring 26 of very weak force urges the member 23 in a counterclockwise direction as viewed in FIG. 11. Also, the free end of the "C" member 23 is provided with a bent-off portion 23a on which the projection 12b of the distance adjusting ring 12 comes to abut. FIGS. 9 and 11 illustrate the distance adjusting ring 12 out of the infinite focusing position so that the intermediate stopper 21 is, as illustrated in FIG. 11, prevented from axially moving. When the distance adjusting ring 12 is turned to the infinite fcusing position of FIG. 12, the "C" member 23 is turned about the pivot pin 25 by the projection 12b of the distance adjusting ring 12, whereby its tail 23b is moved away from the path of movement of the intermediate stopper 21. It is, therefore, only in the infinite focusing position that the intermediate stopper 21 becomes able to change over between the operative position and the retracted or inoperative position.

In this or third embodiment, focusing is operated with selection of only two modes, one of which is over the entire focusing range as in the ordinary lenses, and the other of which is with the limitation to shots of infinitely distant object as in the former mode to portraitures at longer distances than about 1 meter. Therefore, the user is freed from confusing in focusing mode setting, and can expect safety. As a modification of this or third embodiment, an electrical switch may be used as arranged to be actuated when the distance adjusting ring is in the infinite focusing position or another focusing position for a certain prescribed object distance. The output of the switch is applied to a solenoid controlling the operation of the C type ring in such a manner that the end portion 23b is attracted in the direction of stopper 21 in FIG. 12.

Though the first embodiment has been described in connection with the manually operable intermediate stopper 21, it is also possible to electrically automate the operation of the intermediate stopper as in a fourth embodiment shown in FIG. 13. In this case, the intermediate stopper 30 has a drive connection rod 30a with an iron core 32 at the free end of the rod 30a. The iron core 32 is movably fitted in solenoids 31a and 31b. On either side of the iron core 32 are permanent magnets 33a and 33b. The solenoids 31a and 31b and the magnets 33a and 33b are fixedly mounted on the outer barrel 4. A switch 34 is connected in the circuit connecting the solenoids 31a and 31b with an electrical power source 19. When the pole of this switch 34 is in contact with a first throw 34a, the iron core is attracted to the first permanent amgnet 33a, thereby the intermediate stopper 30 is moved to the operative position shown in FIG. 13. Conversely when the pole is in contact with a second throw 34b, the stopper 30 is retracted.

Figure 13:
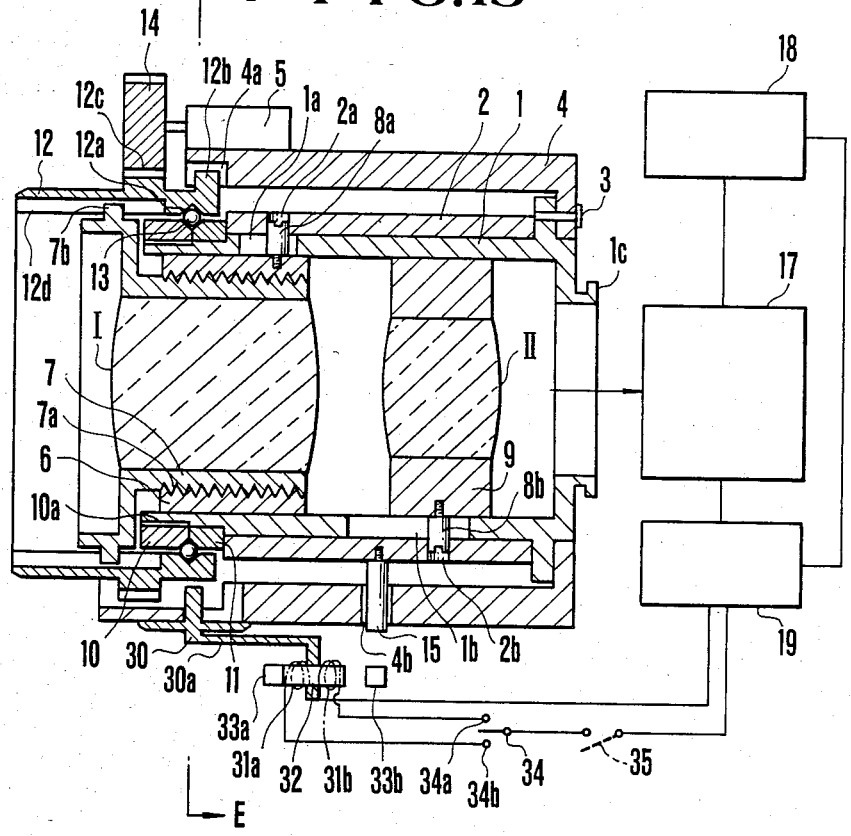
FIG. 13 is a sectional view of the fourth embodiment.
Figure 14:
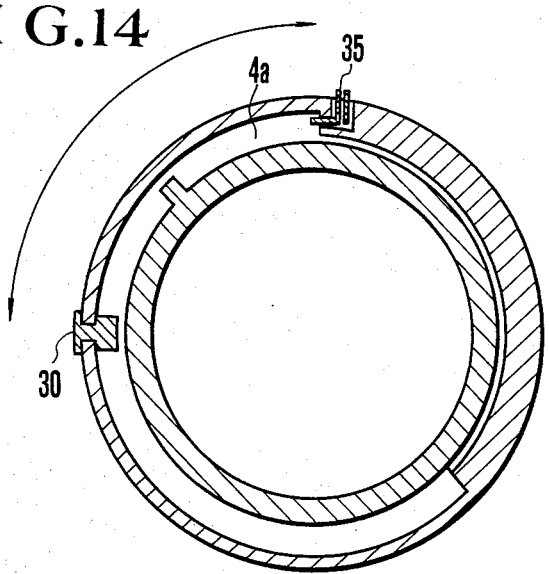
FIG. 14 is a cross-sectional view taken along E—E line of FIG. 13 when a switch 35 is in use.

An additional switch 35 may be connected in series to the switch 34 of FIG. 13 and is arranged as shown in FIG. 14 to be closed when the distance adjusting ring 12 is in the infinite focusing position. The use of two switches at a time makes it possible to change over the intermediate stopper 30 only when the distance adjusting ring 12 is in the infinite focusing position, as the aforesaid first switch 34 is operated.

Though the foregoing or fourth embodiment has been described with the intermediate stopper 30 made movable only when the distance adjusting ring 12 is in the infinite focusing position, the intermediate stopper 30 may be otherwise made movable when in the minimum focusing position or a desired focusing position. It is also possible to make the intermediate stopper 30 movable in a plurality of focusing positions.

Also though the foregoing embodiments have all been described in connection with the zoom lens as the photographic lens, it is of course possible to apply the present invention to fixed focal length lenses and other lenses.

As has been described in greater detail above, according to the present invention, the lens mounting is provided with an intermediate stopper for having the maximum possible angle of rotation of the distance adjusting ring with an advantage that the required time for attaining the in-focus condition can be remarkably shortened in the majority of photographic situations which may be usually encountered. Also when the intermediate stopper is retracted, the lens mounting is rendered operative over the entire focusing range as in the general lenses.

Further, as the intermediate stopper is arranged to change over between the operative and inoperative positions only when in a certain focusing position or positions, the user can realise with ease what region of the focusing range the distance adjusting ring is limited to, the normal photography or closeup photography. As a result, a faulty operation is prevented from occurring and the reliability of the auto-focus camera can be heightened.

What is claimed is:

1. A lens mounting comprising:
    (a) a focusing lens and a lens holder;
    (b) a distance adjusting ring for moving said focusing lens,
        said distance adjusting ring including a radial projection for stopping rotation of said distance adjusting ring;
    (c) a body tube including first and second stop portions for engagement with said radial projection of said distance adjusting ring; and
    (d) stop means for shortening the range of movement of said distance adjusting ring,
        said stop means including a stopper axially movable between a position for engagement with said radial projection of said distance adjusting ring and another position for disengagement therefrom.

2. A lens mounting according to claim 1, further including an abutment provided on the outer periphery of said distance adjusting ring for blocking movement of said stopper,
    whereby said stopper is prohibited from moving when said distance adjusting ring is in a certain region of the range of rotation thereof.

3. A lens mounting according to claim 1, further comprising:
    a movement prohibiting member for said stopper releasably engageable with said stopper of the stop means,
    said movement prohibiting member being mounted to said body tube and determining whether or not said stopper is allowed to move depending on the position of said distance adjusting ring.

* * * * *